United States Patent [19]

Kitamura

[11] Patent Number: 5,211,368
[45] Date of Patent: May 18, 1993

[54] ANGLE ADJUSTING DEVICE FOR A DISPLAY DEVICE

[75] Inventor: Yoshiharu Kitamura, Komagane, Japan

[73] Assignee: NHK Spring Co., Ltd., Yokohama, Japan

[21] Appl. No.: 634,232

[22] Filed: Dec. 27, 1990

[30] Foreign Application Priority Data

Dec. 29, 1989 [JP] Japan ................................. 1-340928

[51] Int. Cl.⁵ ............................................ E05D 11/00
[52] U.S. Cl. .................................... 248/292.1; 16/337; 192/8 C; 248/923; 403/146; 403/373
[58] Field of Search ............... 248/292.1, 923; 16/342, 16/337, 305, 306, 307; 403/146, 373; 188/67, 77 W; 192/8 C

[56] References Cited

U.S. PATENT DOCUMENTS 4,072,285 2/1978 Greenwood .................. 248/292.1 X
4,574,423 3/1986 Ito et al. .......................... 16/342 X

FOREIGN PATENT DOCUMENTS 2057000 7/1971 Fed. Rep. of Germany ........ 16/342
999580 7/1965 United Kingdom ................. 16/342

Primary Examiner—David L. Talbott
Attorney, Agent, or Firm—Keck, Mahin & Cate

[57] ABSTRACT

An angle adjusting device for a display device, wherein at least one coil spring having a free end and another end fixed on a rotatable axis is mounted closely on the inner wall of a fixed axis so as not to expose, and the angle of inclination of a display device is adjusted by a locking torque between the fixed axis and the coil spring.

5 Claims, 3 Drawing Sheets

ANGLE ADJUSTING DEVICE FOR A DISPLAY DEVICE

BACKGROUND OF THE INVENTION

The present invention relates to an angle adjusting device for adjusting an angle of inclination of a display device such as a lap-top type word processor, a personal computer and various lid shaped components to be mounted movably on a main body.

It is necessary for display component to be adjusted to an adequate angular position which is adequate for operator. Therefore, the angle of inclination has been adjusted without step by using various angle adjusting devices. As disclosed by the Japanese Patent Application Laid-open No. 63-23407 and Japanese Utility Model Application Publication No. 1-135397, conventional angle adjusting devices comprise a rotatable axis directly or indirectly mounted on a component necessitating an angle adjustment such as a display unit, a fixed axis mounted directly or indirectly on a main body and a coil spring closely inserted over the rotatable axis and the fixed axes for locking the rotation of the rotatable axis so as to surround. The display unit can be kept at an arbitrary angular position by means of frictional torque between the rotatable axis and the coil spring, and the rotatable axis can be rotated when an outer force stronger than the frictional torque is applied.

However, in the conventional angle adjusting devices, at least one coil spring is exposed, because the coil spring is closely and externally wound over an abutted portion of a rotatable axis and fixed axes. Therefore, a lubrificant applied between the coil spring and the rotatable axis and the fixed axes is splashed on other components damaging the main device on which the adjusting device is applied. Also, it is easy to have dust penetrated into narrow spaces between the components thereof sometime causing an irregular function. Further, it is not preferable to have the coil spring exposed.

The present invention was developed taking this situation in consideration and provides an angle adjusting device for a display device dispensing a coil spring exposed.

SUMMARY OF THE INVENTION

In order to carry out above object, an angle adjusting device according to the present invention has a fixed axis of tubular form, a rotatable axis of tubular form mounted rotatably on the fixed axis and a coil spring inserted closely on the inner walls of the fixed axis and the rotatable axis. Another embodiment of the angle adjusting device according to the present invention has a fixed axis, a coil spring inserted closely on the inner wall of the fixed axis and a rotatable axis mounted rotatably in the coil spring. At least an end of the coil spring is fixed on the rotatable axis.

In the both structures, the coil spring is inserted in the interior of the rotatable axis and the fixed axis, or in the fixed axis and mounted closely on their inner walls, dispensing an external assembling of a coil spring.

BRIEF DESCRIPTION OF THE DRAWINGS

FIG. 10 (b) indicates a partial amplified view of the third embodiment in FIG. 10 (a).

DETAILED DESCRIPTION OF THE PREFERRED EMBODIMENTS

Figure 1:
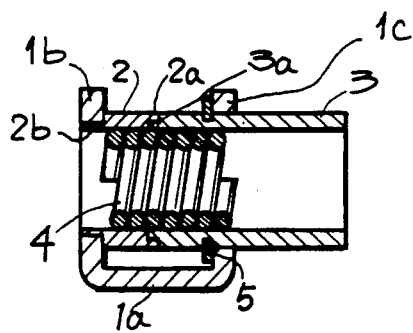
FIGS. 1 to 4 show a sectional view, a front view, a bottom view and a right side view of a first embodiment according to the present invention.
Figure 2:
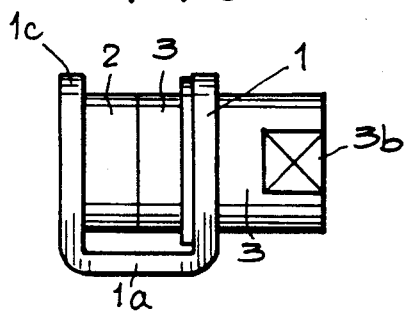
Figure 3:
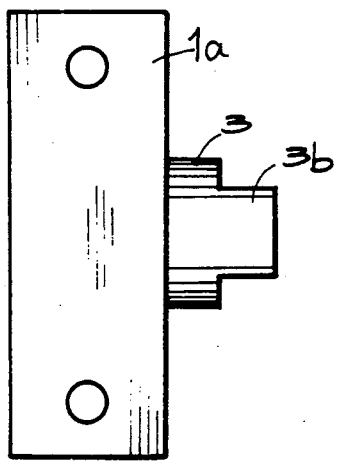

Hereinafter, some embodiments of the angle adjusting device according to the present invention will be described referring to the drawings. Identical elements are indicated with same numerals so as to avoid a repetitive description.

FIG. 1 to 4 show the first embodiment of the angle adjusting device according to the present invention. The first angle adjusting device is mounted rotatably on the pivoting portions of a display device and a main body. The device has a fixed axis 2 fitted in a bearing 1 to be mounted on a main body, a rotatable axis 3 to be mounted on a display device so as to adjust an angle of inclination thereof and a coil spring 4 mounted closely on the inner wall of the fixed axis 2 and the rotatable axis 3. The fixed axis 2 is fitted in the bearing 1 having a channel form section. A foot portion 1a of the bearing 1 is to be fastened directly or indirectly on the main body. In this case, the fixed axis is made of tube and has a large inner diameter portion 2a and a small diameter portion 2b. The small diameter portion 2b is fitted in a fixed axis side 1b of the bearing 1.

The rotatable axis 3 is made of tube of same dimension with the fixed axis 2 and has a small diameter portion 3a. The small diameter portion 3a is supported rotatably by the large inner diameter portion 2a of the fixed axis 2 and a rotatable axis side 1c of the bearing 1. In this case, the rotatable axis 2 rotates coaxially together with the fixed axis 2. The rotatable axis 3 is retained by a snap ring 5. Since the device has above structure, there is formed an inner cylinder form. A coupling portion 3b is formed on the outer surface of the right end portion of the rotatable axis 3. The coupling portion 3b is to be connected to the display device so as to be rotated in forward or reverse direction together with the display device. The outer diameter of a coil spring 4 is a little larger than the inner diameters of the rotatable axis 3 and the fixed axis 2 in free state. The coil spring 4 is forced into the inner cylinder portions of the both axes 2 and 3. A frictional force is obtained between the outer surface of the coil spring 4 and the inner walls of the rotatable axis 3 and the fixed axis 2. In this case, the both ends of the coil spring 4 are free. Also, in this embodiment, the number of effective windings on the inner wall of the rotatable axis 3 is larger than that on the inner wall of the fixed axis 2. Therefore, the coil spring 4 is fixed on the rotatable axis 3. Accordingly, when the rotatable axis 3 is rotated by an outer force, the coil spring 4 rotates slipping on the inner wall of the fixed axis 2.

Figure 4:
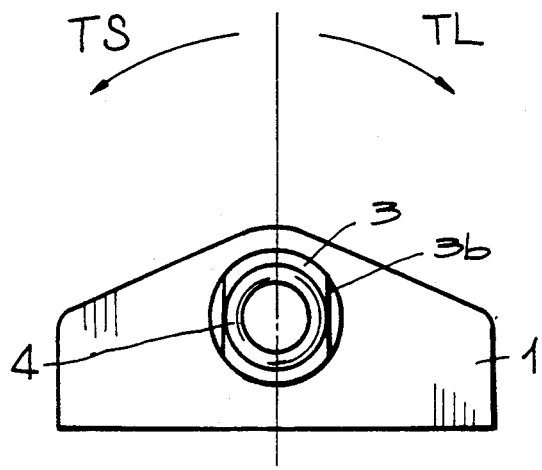

As shown in FIG. 4, when the rotatable axis 3 is rotataed by an outer force larger than the frictional force in the direction TS, the coil spring 4 rotates as described above, because the turning direction of the rotatable axis 3 is same with a direction to decrease the diameter of the coil spring 4. When the outer force is suspended at a desired angle of inclination, the diameter of the spring 4 restores the former dimension. Then, the spring 4 works to obtain the frictional torque again so as to restrict the rotation of the rotatable axis 3. Accordingly, the display device is maintained at the desired angle of inclination.

When another outer force is applied on the rotatable axis 3 in the direction TL, a frictional force (locking torque) occurs between the coil spring 4 and the inner wall of the fixed axis 2, because the turning direction TL of the rotatable axis 3 is same with an enlarging direction of the diameter of the spring. Therefore, the rotation of the rotatable axis 3 is restricted and the display device can be maintained at a desired angle of inclination.

Accordingly, the rotation of the rotatable axis 3 in forward and reverse directions is controlled and the display device is maintained at an arbitrary angle of inclination and in an arbitrary rotating direction. An angle adjustment of the display device is performed by operating the display device, by applying a rotational torque superior to the frictional force on the display device.

In this embodiment, the coil spring 4 is not exposed, but inserted in the inner cylinder portion of the fixed axis 2 and the rotatable axis 3. Therefore, a possible splash of lubricant or an irregular operation due to dust accumulated on the exposed components is prevented improving an appearance thereof. Also, the angle adjusting operation is stabilized by using the large frictional force obtained between the outer surface of the coil spring and the inner wall of the fixed axis.

Also, the reduction of weight of the fixed axis and the rotatable axis is performed because of the tubular form thereof, in which a power cable thereof is located, dispensing an exposed power cable and simplifying the wiring of the display device.

Figure 5:
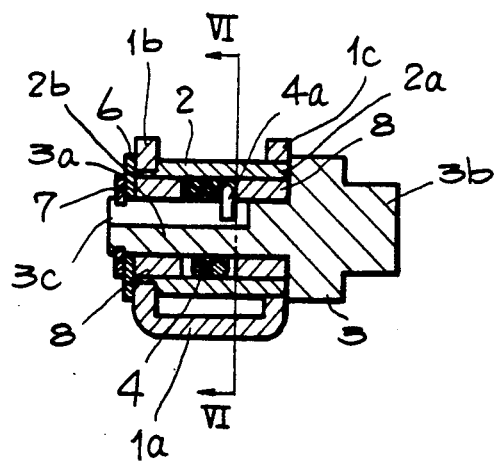
FIGS. 5 to 7 show a sectional view, a section along line VI—VI and a right side view of a second embodiment.
Figure 6:
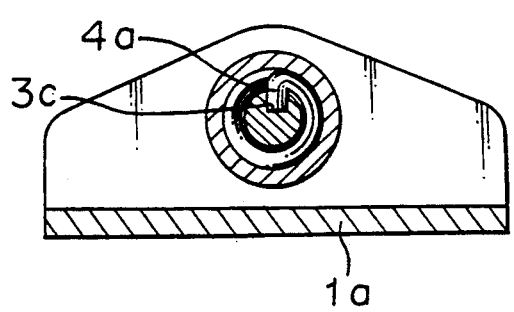
Figure 7:
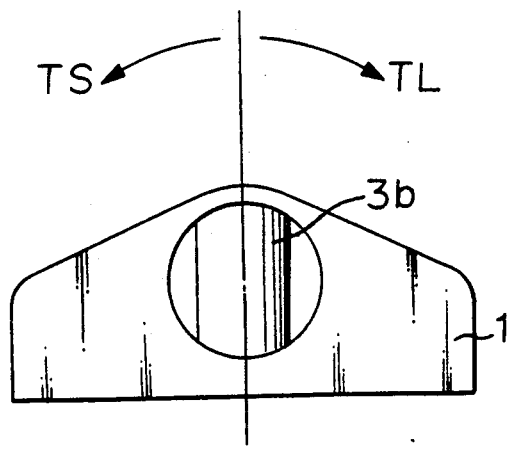

FIGS. 5 to 7 show a second embodiment of the angle adjusting device according to the present invention, wherein a small diameter portion 2b of the fixed axis 2 is fitted in a fixed axis side 1b of a bearing 1 and other end of the fixed axis 2 is supported by other side 1c of the bearing 1. A coil spring 4 has a free end and a hook portion 4a. The coil spring 4 is closely mounted on the inner wall of the fixed axis 2. A pair of collar 8 are mounted on the both sides of the spring 4 so as to prevent a delocation of the coil spring 4 in an axial direction and to work as bushing.

A rotatable axis 3 has a small diameter portion 3a and a coupling portion 3b. A groove 3c is formed on the small diameter portion 3a for inserting the hook portion 4a. The rotatable axis 3 is inserted in the collars 8 and the coil spring 4, and is retained by a flat washer 6 and a snap ring 7. The coupling portion 3b has a flat portion for coupling. In this case, a frictional force is obtained between the outer surface of the coil spring 4 and the inner wall of the fixed axis 2 as well as the first embodiment aforementioned.

When an outer force superior to the above frictional force is applied on the rotatable axis in the direction TS as shown in FIG. 7, the outer force is transmitted to the coil spring 4 through the hook portion 4a, and there occurs a slippage (slipping torque) between the outer surface of the coil spring 4 and the inner wall of the fixed axis, because the outer force is applied in the direction TS to reduce the diameter of the coil spring 4.

When another outer force is applied on the fixed axis in the direction TL as shown in FIG. 7, the outer force is transmitted to the coil spring 4 through the hook portion 4a and there occurs a frictional force (locking torque) between the outer surface of the coil spring 4 and the inner wall of the fixed axis 2.

The rotation of the rotatable axis 3 is controlled in the both directions, forward and reverse, by using the frictional forces (locking torques) so as to hold the display device at a desired angle of inclination as well as the first embodiment. The angle adjustment is performed by applying a larger torque than the frictional torques on the rotatable axis 3, as well as the first embodiment.

Figure 8:
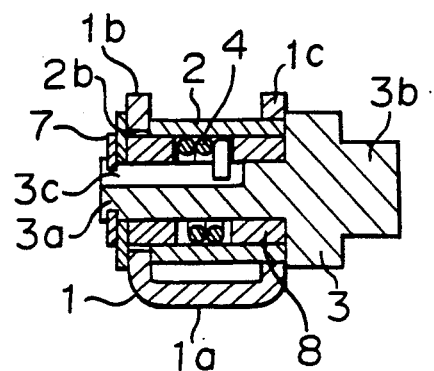
FIG. 8 shows another variation of the second embodiment.

FIG. 8 shows a variation of the second embodiment, wherein a coil spring 4 made of square wire is used. In this case, the angle adjusting device works in the same way as well as the former embodiments.

Figure 9:
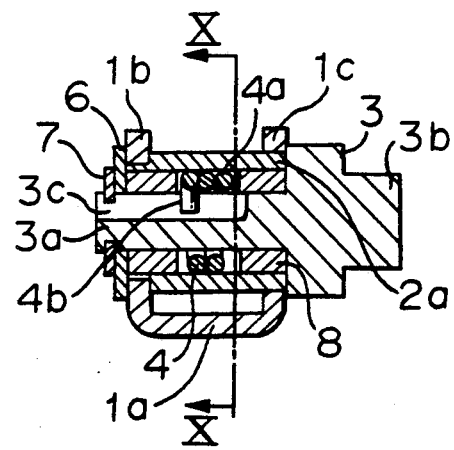
FIG. 9 shows a vertical section of a third embodiment.
Figure 10A:
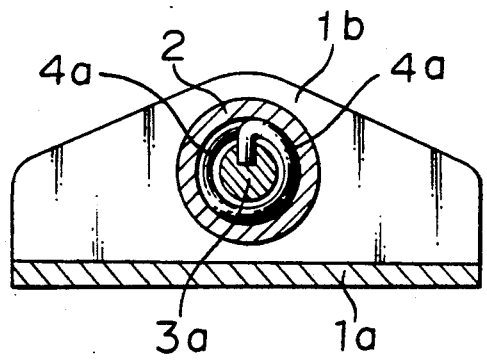
FIG. 10 (a) shows a section along line X—X in FIG. 9.
Figure 10B:
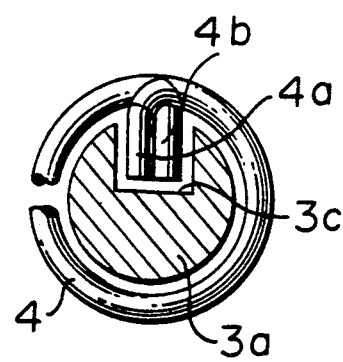

FIGS. 9 to 10 show a third embodiment, wherein the both ends of a coil spring 4 extend to form a hook portion 4a and 4b. These hook portions 4a and 4b are inserted in a groove 3c formed on a small diameter portion 3a of a rotatable axis 3 both abutting on the walls of the groove 3c.

Figure 11:
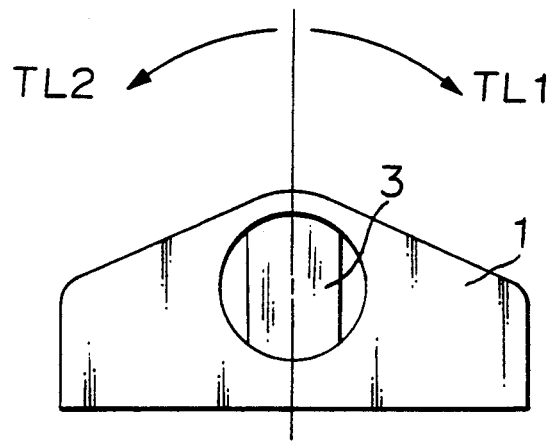
FIG. 11 shows a right side view of the third embodiment.

When an outer force is applied on the rotatable axis 3 in the direction TL1 as shown in FIG. 11, the outer force is transmitted to the coil spring 4 through the hook portion 4a, then, the diameter of the coil spring 4 is enlarged.

When another outer force is applied on the rotatable axis 3 in the direction TL2, the outer force is transmitted to the coil through the hook portion 4b and the diameter of the coil spring 4 is enlarged.

In this way, the rotation of the rotatable axis 3 is controlled, that is to say that the angle of inclination of a display device is changed only when an outer force superior to the frictional force obtained between the inner wall of the fixed axis 2 is applied in forward or backward direction.

Figure 12:
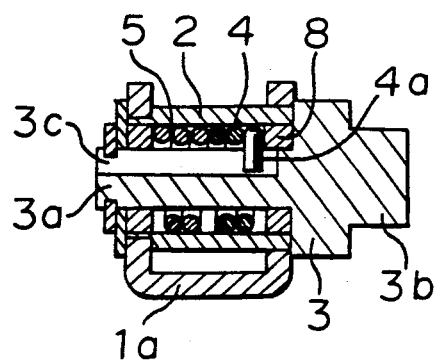
FIG. 12 shows a section of a fourth embodiment.

FIG. 12 shows a fourth embodiment of the angle adjusting device according to the present invention. A pair of coil spring 4 and 5 are inserted closely on the inner wall of a fixed axis 2. These coil springs 4 and 5 are wound in reverse direction respectively, of which ends are formed hook portions 4a and 5a (not shown). The hook portions 4a and 5a are inserted in a groove 3c formed on a small diameter portion 3a of a rotatable axis 3.

When an outer force is applied on the rotatable axis 3 in the direction indicated with an arrow, the inner diameter of the coil springs 4 is enlarged, and there occurs a frictional force between the inner wall of the fixed axis 2 and the outer surface of the coil spring 4. At the same time, the inner diameter of the coil spring 5 is reduced, and there occurs a slippage force between the inner wall of the fixed axis 2 and the outer surface of the spring 5.

When an outer force is applied on the rotatable axis 3 in the opposite direction indicated by an arrow in dotted line, the inner diameter of the coil spring 4 is reduced, and there occurs a slippage. The inner diameter of the coil spring 5 is enlarged, and there occur a frictional force.

Therefore, a display device fixed on the rotatable axis 3 is held at an arbitrary angle of inclination by the total frictional torque of the coil springs 4 and 5 on the inner wall of the fixed axis 2.

Figure 13:
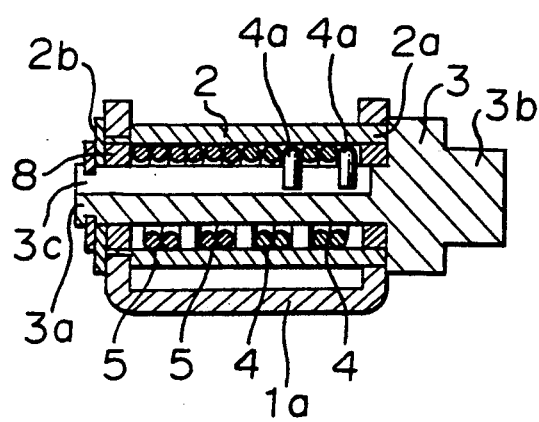
FIG. 13 shows another variation of the fourth embodiment.

FIG. 13 shows another variation of a fourth embodiment of the angle adjusting device according to the present invention. A pair of coil springs 4 with hook portions 4a wound in the same direction are mounted closely on the inner wall of a fixed axis 2. And, a pair of coil spring 5 with hook portions 5a (not shown) wound in reverse direction are mounted closely on the inner wall of the fixed axis 2. The hook portions, 4a and 5a are inserted in a groove 3c formed on a small diameter portion 3a of a rotatable axis 3.

According to the above embodiments, at least one coil spring is inserted closely on the inner wall of the fixed axis and a hook portion thereof is inserted in the groove on the small diameter portion of the rotatable axis, and any coil spring is not exposed. Therefore, an effect for avoiding a splash of lubrificant, a deterioration of appearance and an irregular function due to dust accumulated therein is obtained.

Also, in this type of angle adjusting device, a larger locking torque and a slipping torque are obtained, because the outer surface of the spring is forced on the inner wall of the fixed axis, and a wedging effect is obtained in comparison with other types, wherein only a wrapping effect can be obtained.

What is claimed is:

1. An angle adjusting device for a display device comprising:
   a channel type bearing;
   a tube type fixed axis having a small diameter portion fitted in said bearing and a large inner diameter portion on another end;
   a tube type rotatable axis having a small diameter portion and rotatably inserted in said fixed axis; and
   a coil spring having free ends and mounted closely on the inner walls of said tube type fixed axis and said tube type rotatable axis.

2. An angle adjusting device according to claim 1, wherein said tube type fixed axis not having a large inner diameter portion is fitted in said bearing.

3. An angle adjusting device according to claim 1, wherein said tube type rotatable axis having a coupling portion, a small diameter portion with a groove is rotatably inserted in a pair of collars located on the both sides of said spring mounted on the inner wall of said fixed axis.

4. An angle adjusting device according to claim 1, wherein said coil spring having a hook portion on the both ends thereof inserted in said groove formed on said small diameter portion of said tube type rotatable axis.

5. An angle adjusting device according to claim 1, wherein a plurality of coil spring wound in different direction are mounted closely on the inner wall of said tube type fixed axis.

* * * * *